(12) United States Patent
Yamaoda

(10) Patent No.: US 10,295,778 B2
(45) Date of Patent: May 21, 2019

(54) FISHEYE LENS FILTER

(71) Applicant: Tadashi Yamaoda, San Francisco, CA (US)

(72) Inventor: Tadashi Yamaoda, San Francisco, CA (US)

( * ) Notice: Subject to any disclaimer, the term of this patent is extended or adjusted under 35 U.S.C. 154(b) by 158 days.

(21) Appl. No.: 15/284,760

(22) Filed: Oct. 4, 2016

(65) Prior Publication Data

US 2017/0102512 A1 Apr. 13, 2017

Related U.S. Application Data

(60) Provisional application No. 62/238,294, filed on Oct. 7, 2015.

(51) Int. Cl.
*G02B 7/00* (2006.01)
*G03B 11/04* (2006.01)
*G02B 13/06* (2006.01)

(52) U.S. Cl.
CPC ............ *G02B 7/006* (2013.01); *G03B 11/041* (2013.01); *G02B 13/06* (2013.01)

(58) Field of Classification Search
None
See application file for complete search history.

(56) References Cited

U.S. PATENT DOCUMENTS

2013/0129338 A1* 5/2013 Dowell ............... G03B 11/041
396/448

* cited by examiner

*Primary Examiner* — Ricky L Mack
*Assistant Examiner* — Gary W O'Neill
(74) *Attorney, Agent, or Firm* — Alexis J Saenz

(57) ABSTRACT

A fisheye lens filter for a fisheye lens includes an optically clean dome sized to fit over the fisheye lens. The dome includes in some embodiments a coating layer(s) to filter out light as desired for use in recording an image. The fisheye lens filter provides an unobstructed field of view in front of fisheye lenses preventing optical aberrations such as vignetting while providing filtering effects.

3 Claims, 5 Drawing Sheets

FISHEYE LENS FILTER

CROSS-REFERENCE TO RELATED APPLICATION

This application claims benefit under 35 U.S.C. § 119(e) of U.S. Provisional Application having Ser. No. 62/238,294 filed Oct. 7, 2015, which is hereby incorporated by reference herein in its entirety.

FIELD

The subject disclosure relates to optics and more particularly, to filters for fisheye lenses.

BACKGROUND

In the field of optics, light may be manipulated to change the end effect seen through a lens. For example, in cameras, filters are commonly used to modify the image recorded. Conventional lens filters are planar (flat) and are generally either screw-on or holder type (slot drop-in, square, or rectangular types). Drop-in type filters are typically positioned behind the lens, so the filter would rest between the lens and the body of the camera. Sometimes, since a flat filter is mounted in front of the lens with rings, the mount is in the optical path way and vignetting occurs.

These kinds of problems can be magnified when working with a fisheye lens. For example, conventional lens filters may be very wide and cumbersome resulting in being caught in the extremely wide field of view of a fisheye lens, thus interfering with the image.

As can be seen, there is a need for a lens filter that can be used with a fisheye lens without interfering with the field of view.

SUMMARY

In one aspect of the disclosure, a fisheye lens filter for a fisheye lens mounted to a camera lens system of a camera comprises an optically clean dome including: an open base side and a dome height, the open base side having a diameter greater than a diameter of the fisheye lens and the dome height of the fisheye lens filter being greater than a dome height of the fisheye lens, and a front curve of the dome equal to or greater than a front curve of the fisheye lens. The fisheye lens filter also includes a coating layer on the dome to filter an optical property of light passing through the dome.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Referring to the Figures in general, exemplary embodiments of the subject technology provide a fisheye lens filter for use with a fisheye type lens. Embodiments shown may be an accessory mounted over a fish eye lens which itself is mounted onto a camera. Aspects of the fisheye lens filter provide filtering while eliminating or at least mitigating optical aberrations caused by conventional filters used with fisheye lenses.

Figure 1:
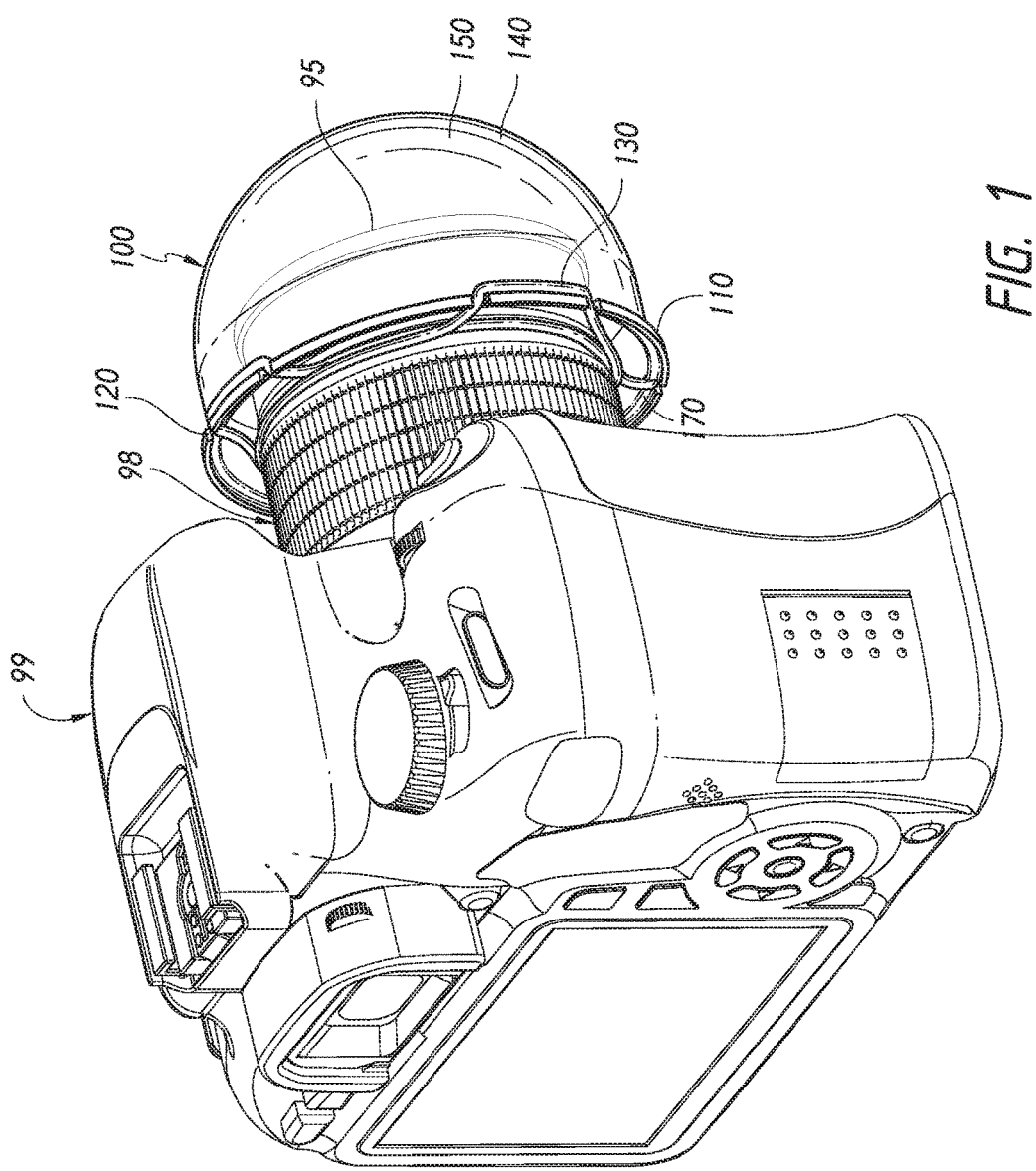
FIG. 1 is a perspective side view of a fisheye lens filter system mounted to a camera in accordance with an aspect of the subject technology.
Figure 2:
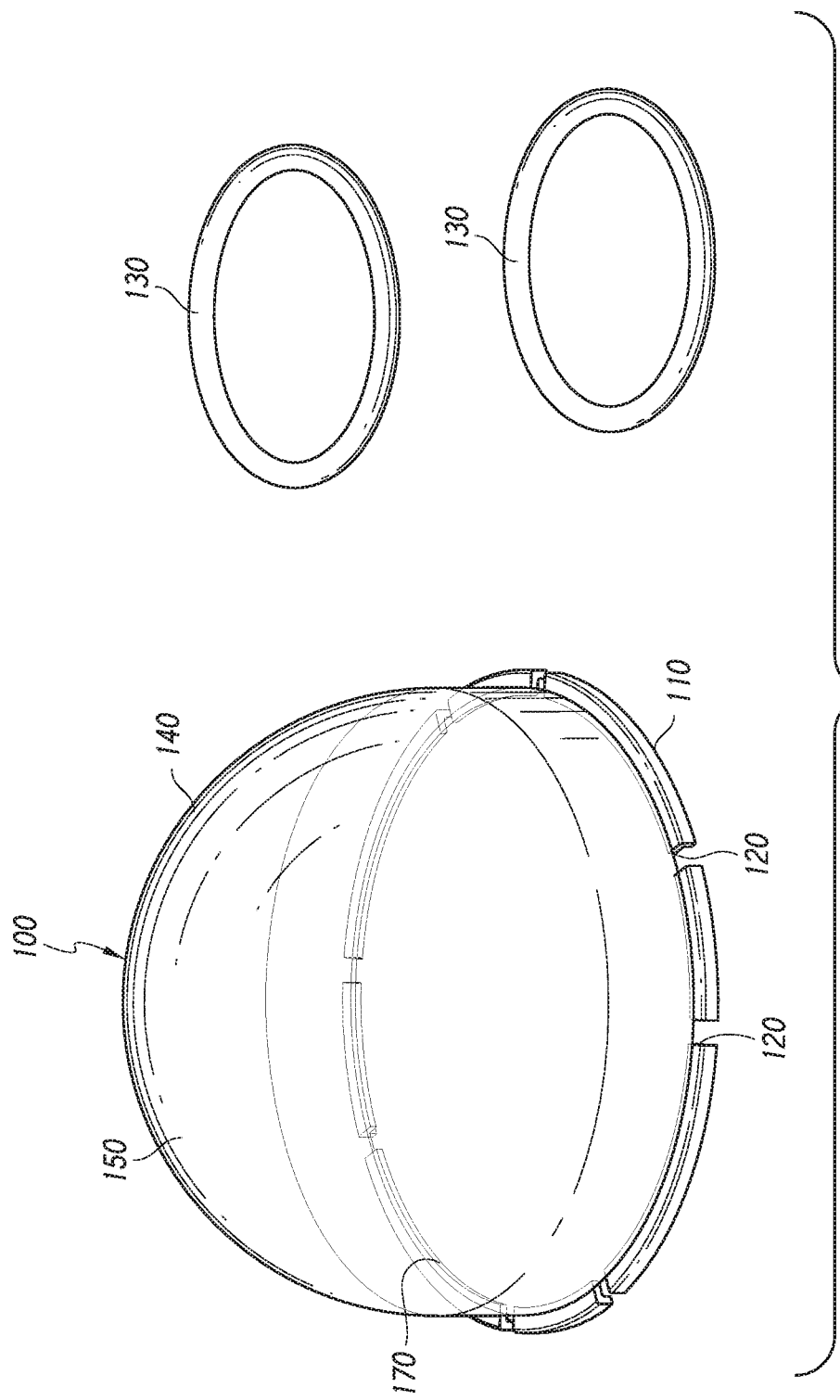
FIG. 2 is a perspective side view of a fish eye lens filter and mounting bands from FIG. 1 disassembled from the camera of FIG. 1 in accordance with an aspect of the subject technology.
Figure 3:
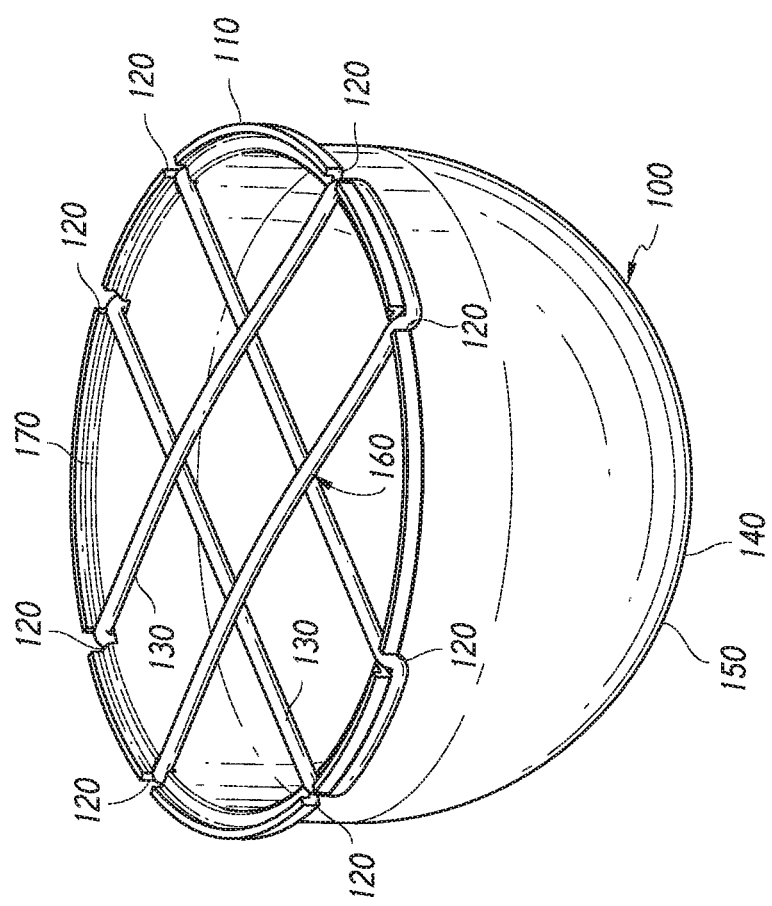
FIG. 3 is a perspective, bottom side view of the fish eye lens filter and mounting bands from FIG. 1 dismounted from the camera.

Referring now to FIGS. 1-3, a system embodiment includes a fisheye lens filter 100 that is configured to mount over, in front of, and onto the lens system 98 of a camera 99. In an exemplary embodiment, the fisheye lens filter 100 is mounted over a fisheye lens 95. In the drawings shown, the fisheye optic is obscured from view by the perspective however it will be understood as being present as is known in the art of camera optics.

The fisheye lens filter 100 may include an optically clean dome 150. The dome 150 may be made from for example, acrylic or polycarbonate plastic. The dome 150 includes an open base side that may be wide enough to fit around the underlying fisheye lens 95 and supporting camera lens system 98. The filter's dome height may be greater than the dome height of the fisheye lens so that when mounted, the apex of the fisheye lens filter dome 150 is positioned over and spaced from the fisheye lens' 95 apex. The front curve of the dome 150 is greater than the front curve of the fisheye lens 95 so that the field of view of the fisheye lens filter 100 is at least equal to or greater than the field of view of the fisheye lens 95. In some embodiments, the dome 150 may fit around and surround the camera lens system mount 98.

In an exemplary embodiment, the dome 150 also includes a coating layer 140. The coating layer 140 may filter out an optical property of light passing through the dome (for example, UV transmission, polarization, neutral density, color warming/cooling, etc.). In some embodiments, the coating layer 140 is on the convex side of the dome. Some embodiments may include an anti-reflective coating. Other color and special effects coatings may include those that produce for example soft focus, spot, fog, streaking, gradient, flare, screen, star, spectral crossing effects.

In some embodiments, the dome 150 surface may include a finish, for example a texture that produces an optical aberration for an image captured through the filter 100. For example, the finish may produce special effects for an image including waviness, distorted or disproportionate elements of an object, and color shifting. An exemplary embodiment may include a faceted surface which may produce for example, a kaleidoscope effect.

The fisheye lens filter 100 may include a flange 110 on the open base side that extends radially outward from the base of the dome 150. The flange 110 may include channels 120 extending radially from the perimeter of the flange 120 toward the dome 150 for receipt of bands 130 securing the dome 150 to the camera lens system 98. In an exemplary embodiment, the channels 120 may be positioned along the circumference of the flange 110 in pairs. The channel 120 pairs may be diametrically opposed across the span of the opening of the dome 150 base to another pair of channels 120 so that ends of the bands 130, when looped through the channels 120, form a crisscross pattern 160 (FIG. 3) that secures around the camera lens system 98 (FIG. 1). The fisheye lens filter 100 may be mounted over the fisheye lens 95 so that the elastic band(s) 130 are tensioned around the camera lens mount 98. As may be appreciated, the bands 130 remain out of the field of view while the fisheye lens filter 100 provides optimum field of view coverage over the fisheye lens 95 while being held in place.

Figure 4:
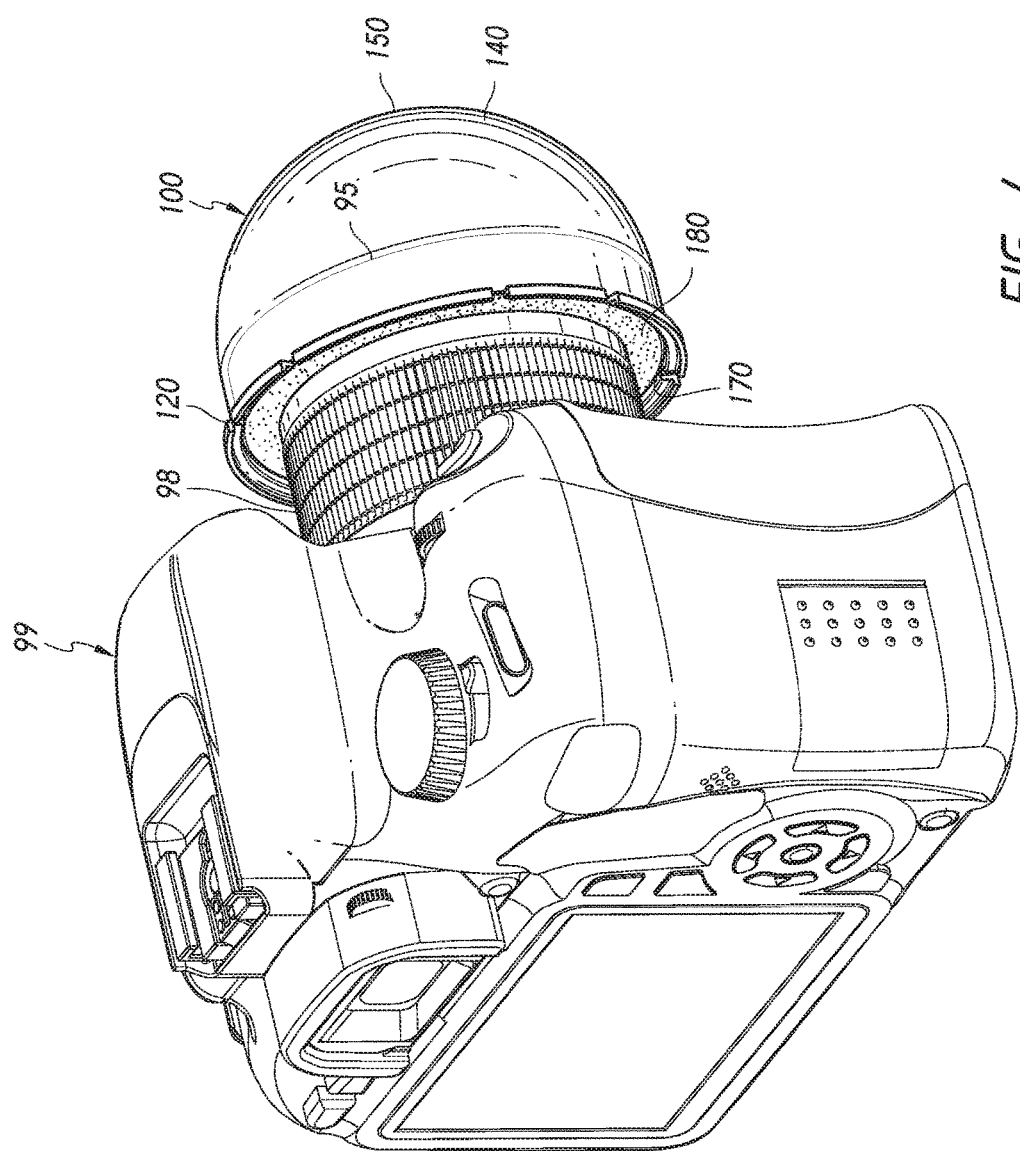
FIG. 4 is a perspective side view of a fisheye lens filter system mounted to a camera in accordance with another aspect of the subject technology.
Figure 5:
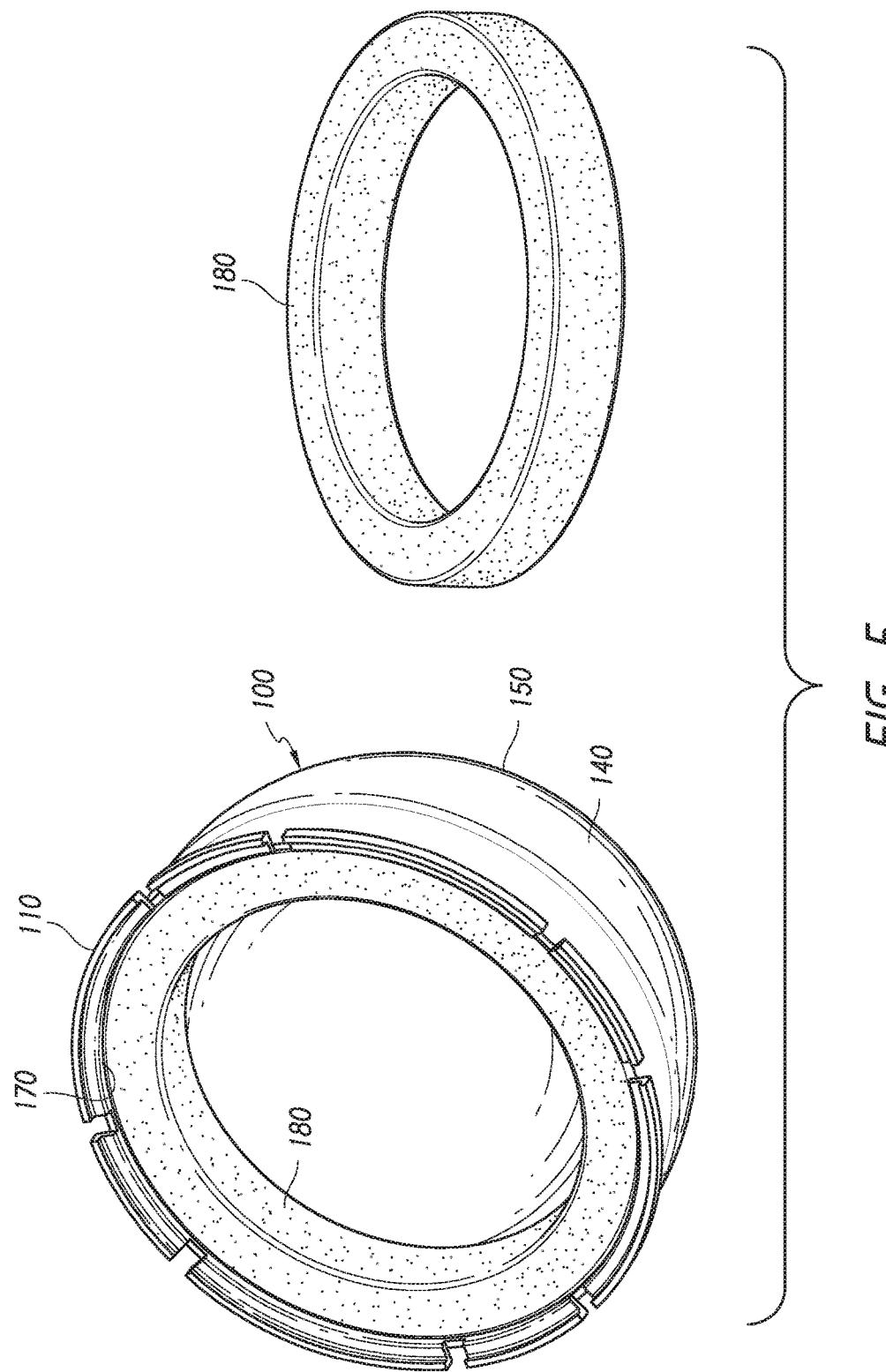
FIG. 5 is a perspective bottom view of the fisheye lens filter and a gasket mount disassembled from the camera of FIG. 4.

Referring now to FIGS. 4 and 5, the fisheye lens filter 100 is shown mounted to the camera 99 using another mounting embodiment. In some embodiments, the fisheye lens filter 100 may include an internal lip 170 (see FIGS. 1-5) projecting radially inward from the base of dome 150. In some embodiments, the system may include a foam gasket 180 that is insertable within the dome 150 to secure fisheye lens filter 100 to the camera lens 98. The gasket 180 may have an outer circumference that is sized to abut against the interior circumference of the dome 150 base. The gasket 180 may include a central opening with an inner circumference sized to index the outer circumference of the camera lens system 98. The gasket 180 may be positioned to rest upon the internal lip 170 so that in operation, the fisheye lens filter 100 is held in place around the camera lens system 98 and over the fisheye lens 95.

As will be appreciated, the fisheye lens filter 100 provides filtering for a fisheye lens without the disadvantages of conventional filters. The fisheye lens filter of the subject technology can physically protect the camera lens. Currently, fisheye lenses may be subject to direct impact because conventional filters do not cover the entirety of the lens. The dome 150 and its shape provides a layer of protection around the extreme wide plane of view of the fisheye lens 95. The dome 150 protects the lens from impact and keeps the front optics of the lens 95 from getting scratches, dust, and moisture. Embodiments also provide an unobscured field of view for extreme wide-angle lenses and 180-degree fisheye lens. Embodiments with a coating layer 140 provide filtering which may be achieved to reduce visible light transmission, UV light, etc. that gets to the front element of the lens while maintain a full, unobscured view. Unlike conventional filters that are typically inserted behind the lens or obstruct the field of view and create optical artifacts, the fisheye lens filter 100 of the subject disclosure permits a full wide-angle field of view without vignetting. By providing for example, an optical coating for filtering, (for example, a neutral density coating), less light enters the front elements of the lens. The photographer may thus be able to use different camera settings with the fisheye lens filter 100 that were previously out of reach with the current amount of light available hitting the lens from conventional filters.

Those of skill in the art would appreciate that various components may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the coating layer 140 was described as being on the convex side of the dome (exterior), it will be understood that some embodiments may lay the coating 140 on the concave side (interior). Still yet, some embodiments may use a clear dome without a coating layer 140 or may include multiple coating layers 140 to provide multiple filtering effects simultaneously. In addition, while an embodiment was described in terms of holding the fisheye lens filter 100 via an elastic band 130 or gasket 180, other configurations may be used, for example locking tabs, clamps, etc.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A fisheye lens filter for a fisheye lens mounted to a camera lens system of a camera, comprising:
    an optically clean dome including:
        an open base side and a dome height, the open base side having a diameter greater than a diameter of the fisheye lens and the dome height of the fisheye lens filter being greater than a dome height of the fisheye lens, and
        a spherical front curve of the dome equal to or greater than a front curve of the fisheye lens, wherein a field of view of the spherical front curve of the dome is at least equal to a field of view of the fisheye lens;
    a coating layer on the dome, the coating layer configured to filter an optical property of light passing through the dome; and
    a base mount on the open base side, wherein
        the base mount is configured to mount to the camera lens system, and
        the spherical front curve of the dome is positioned in front of and over the fisheye lens.

2. A fisheye lens filter for a fisheye lens mounted to a camera lens system of a camera, comprising:
    an optically clean dome including:
        an open base side and a dome height, the open base side having a diameter greater than a diameter of the fisheye lens and the dome height of the fisheye lens filter being greater than a dome height of the fisheye lens, and
        a spherical front curve of the dome equal to or greater than a front curve of the fisheye lens, wherein a field of view of the spherical front curve of the dome is at least equal to a field of view of the fisheye lens;
    a coating layer on the dome, the coating layer configured to filter an optical property of light passing through the dome; and
    a flange extending radially outward from a base of the dome and including channels in the flange, wherein the channels are diametrically opposed across a span of the open base side, for receipt of elastic bands positioned in a crisscross pattern through the channels, to secure the fisheye lens filter onto the camera lens system, wherein the camera lens system is positioned within the crisscross pattern.

3. A fisheye lens filter for a fisheye lens mounted to a camera lens system of a camera, comprising:
    an optically clean dome including:
        an open base side and a dome height, the open base side having a diameter greater than a diameter of the fisheye lens and the dome height of the fisheye lens filter being greater than a dome height of the fisheye lens, and
        a spherical front curve of the dome equal to or greater than a front curve of the fisheye lens, wherein a field of view of the spherical front curve of the dome is at least equal to a field of view of the fisheye lens;
    a coating layer on the dome, the coating layer configured to filter an optical property of light passing through the dome;
    an internal lip projecting radially inward from a base of the dome; and
    a gasket including:
        a central opening with an inner circumference sized to index against an outer circumference of the camera lens system wherein the inner circumference of the gasket is configured to mount onto the camera lens system, and
        an outer circumference of the gasket sized to abut against an interior circumference of the base and rest upon the internal lip.

* * * * *